No. 769,313. PATENTED SEPT. 6, 1904.
W. J. HIGGS.
IRONING TABLE.
APPLICATION FILED MAY 6, 1903.
NO MODEL.
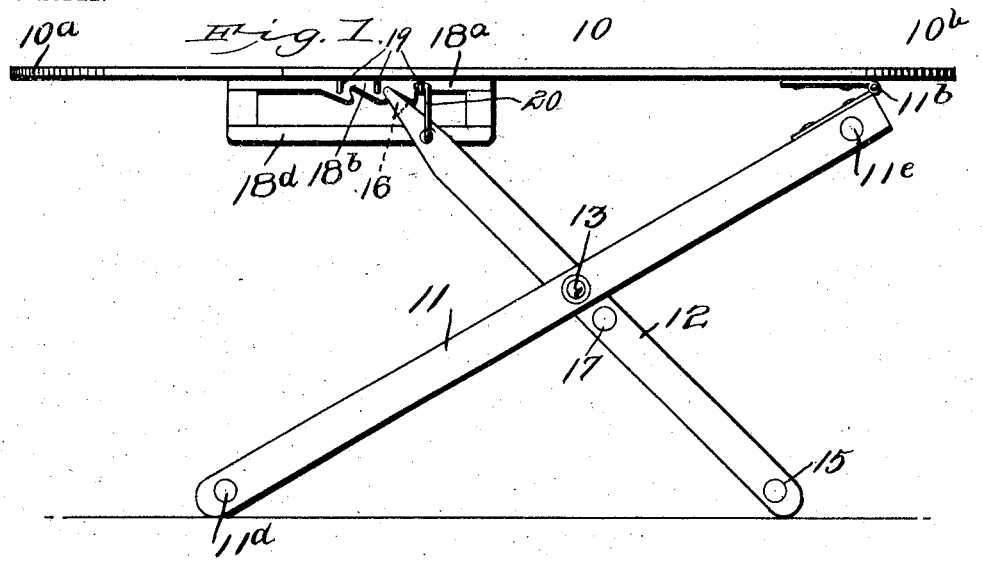
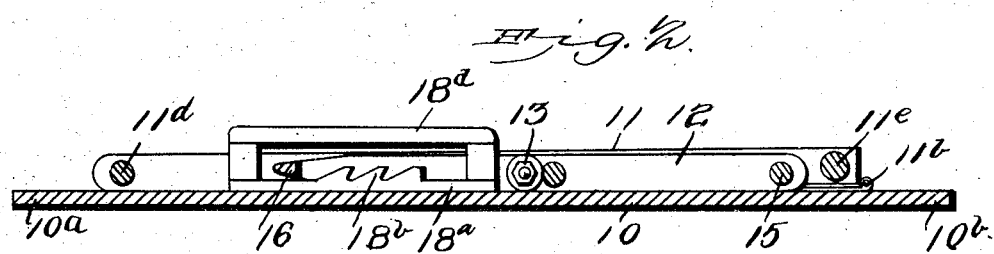
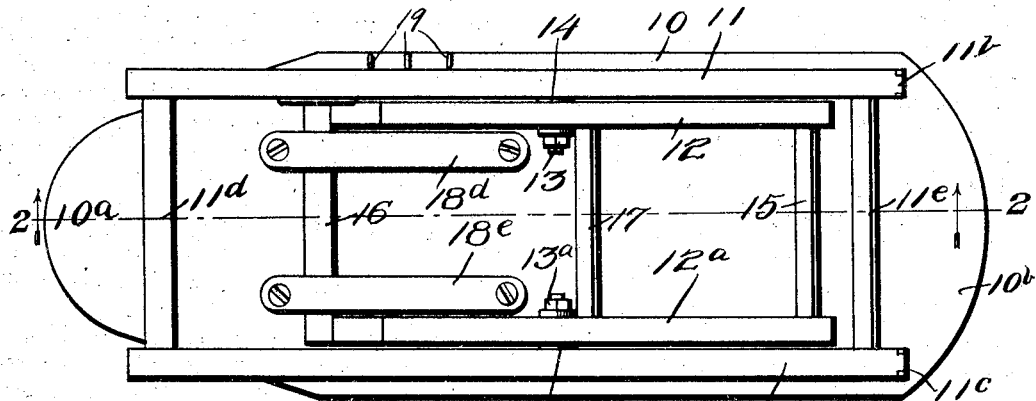
Witnesses
E. F. Stewart
C. N. Woodward
Wallace J. Higgs, Inventor.
by C. A. Snow & Co.
Attorneys No. 769,313. Patented September 6, 1904.

UNITED STATES PATENT OFFICE.

WALLACE JAMES HIGGS, OF LEHI CITY, UTAH.

IRONING-TABLE.

SPECIFICATION forming part of Letters Patent No. 769,313, dated September 6, 1904.

Application filed May 6, 1903. Serial No. 155,907. (No model.)

*To all whom it may concern:*

Be it known that I, WALLACE JAMES HIGGS, a citizen of the United States, residing at Lehi City, in the county of Utah and State of Utah, have invented a new and useful Ironing-Table, of which the following is a specification.

The invention relates to ironing-tables, and has for its object to produce a device of simple construction which may be adjusted in any desired position by merely lifting upward upon the table portion and without manipulating or detaching any of the parts.

Other novel features of the invention will appear in the accompanying description and be specified in the claim following.

In the drawings illustrative of the invention, Figure 1 is a side elevation with the device opened out as in use. Fig. 2 is a longitudinal sectional view taken on line 2 2, of Fig. 3, showing the device collapsed or folded. Fig. 3 is a bottom plan view of the device folded or collapsed.

In the device is comprised a table portion 10 of any required size and with one end, $10^a$, converging or narrowed in the usual manner and having spaced leg members 11 $11^a$ hinged thereto at $11^b$ $11^c$ near one end, the leg members being connected near their ends by transverse rounds $11^d$ $11^e$, as shown. The leg members 11 $11^a$ will lie against the under side of the board 10 when the device is folded, as in Figs. 2 and 3, and extend diagonally thereunder when the device is in use, as in Fig. 1. Two other leg members, 12 $12^a$, will be pivotally connected inside the leg members 11 $11^a$ by bolts 13 $13^a$, as shown, with washers 14 $14^a$ upon the bolts between their respective contiguous parts to reduce the friction and prevent unequal wear and strains. The members 12 $12^a$ will be connected at their lower ends by a transverse "round" 15 and at their upper ends by an angular cross-bar 16 and also connected intermediately by round 17. The portions of the leg members 12 $12^a$ below the pivots 13 $13^a$ will be longer than the portions above the pivots, so that the upper ends of the members 12 $12^a$ and the cross-bar 16 will be maintained normally in their upward position, as indicated in Fig. 1, the object to be hereinafter more fully explained.

Attached to the under side of the table portion 10 in close proximity to the inside of the leg members 12 $12^a$ adjacent to their upper ends are two bars, as $18^a$, both being of the same construction and having spaced ratchet-teeth $18^b$, with which the bar 16 engages, as shown. Each of the bars $18^a$ is provided with a keeper $18^d$ $18^e$, respectively embracing the bar 16 and serving to retain it in movable connection with the table 10. The keepers will be a sufficient distance from the bars $18^a$ to permit the bar 16 to be engaged with any pair of the teeth $18^b$, but will prevent the bar 16 from becoming disengaged from the table. The bars $18^a$ will extend beyond the teeth $18^b$ for a considerable distance, as shown, so that the bars $18^a$ and the keepers $18^d$ $18^e$ will be of sufficient length to provide room for the movement of the bar 16 when the device is folded, as in Figs. 2 and 3. By this simple means the leg members may be folded or collapsed, as in Figs. 2 and 3, and when thus arranged will lie flat against the under side of the table with the members 12 and $18^a$ in close parallel relation and the members $12^a$ and $18^a$ in correspondingly close parallel relations, so that the parts are all firmly supported from lateral movement. The parts are also firmly supported from lateral movement when elevated into operative position, as shown in Fig. 1, as when in that position the keepers $18^d$ $18^e$ closely engage the leg members 12 and $12^a$ and prevent lateral movement between the parts. This is an important feature of the invention and adds materially to the efficiency of the device.

All the detachable parts will be connected by screws and bolts to insure the requisite strength together with ease of construction and assembling of parts. The free ends of the leg members 11 $11^a$ and 12 $12^a$ will preferably be rounded, so that the legs will engage the floor uniformly at all points of the elevation of the device. When thus constructed, when it is desired to use the device it is placed upon the floor with the folded leg members underneath. The table portion 10 is then lifted bodily with the larger end $10^b$ a trifle in advance of the narrow end $10^a$, so that the lower ends of the leg members 12 $12^a$ will be held up free from the floor. This action will cause the heavier lower portions of the leg members 12 12ª to hold the bar 16 in constant engagement with the teeth 18ᵇ and enable the operator to readily adjust the bar to engage any desired tooth without touching any part of the device except the table portion 10. The operator can thus readily adjust the table to any desired height within the range of the ratchet-teeth. When the device is to be collapsed, it is only necessary to reverse the action—that is, lift the narrow end 10ª of the table until the bar 16 is disengaged from the teeth 18ᵇ, when the table can be lowered down and the leg members collapsed.

If it is required to adjust the bar 16 to cause the table portion 10 to assume a lower plane, it can readily be accomplished by lifting the narrow end 10ª until the bar 16 is clear from the teeth and allowing the table to move downward until the desired position is reached, when it can be immediately locked in that position by merely elevating the larger end 10ᵇ. Thus the table can be perfectly controlled without touching any part except the table portion itself, as above described.

If required, a series of staples 19 may be inserted in the under side of the table in transverse alinement with the teeth 18ᵇ and disposed outside the space occupied by the leg members 11 or 11ª when folded, and with which a hook 20 on one of the leg members 12 or 12ª is adapted to engage after the table is adjusted to the required height, so that the table may be "locked" in any required position to prevent accidental displacement.

What I claim is—

In an ironing-table, the combination of a board, spaced leg members hinged at one end to said board, brace leg members spaced apart and arranged between said hinged leg members and pivotally connected thereto intermediately of their lengths, a transverse bar connecting the inner ends of said brace members, spaced ratchet-bars disposed longitudinally of said board on the under face thereof and arranged to extend between the inner faces of said brace leg members and adapted to be detachably engaged by the transverse bar of said brace leg members, and keepers arranged over said ratchet-bars and spaced therefrom in position to permit the free movement of said transverse bar therebetween.

In testimony that I claim the foregoing as my own I have hereto affixed my signature in the presence of two witnesses.

WALLACE JAMES HIGGS.

Witnesses:
JOHN T. WINN,
GEORGE GOETZ.